US009741246B2

(12) United States Patent
Aicher et al.

(10) Patent No.: US 9,741,246 B2
(45) Date of Patent: Aug. 22, 2017

(54) SYSTEM FOR DETERMINING TRAFFIC INFORMATION

(71) Applicant: SIEMENS AKTIENGESELLSCHAFT, Munich (DE)

(72) Inventors: Peter Aicher, Bruckmuehl (DE); Wilke Reints, Feldkirchen Bei Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/913,393

(22) PCT Filed: Aug. 20, 2014

(86) PCT No.: PCT/EP2014/067734

§ 371 (c)(1),
(2) Date: Feb. 22, 2016

(87) PCT Pub. No.: WO2015/024964

PCT Pub. Date: Feb. 26, 2015

(65) Prior Publication Data

US 2016/0203714 A1 Jul. 14, 2016

(30) Foreign Application Priority Data

Aug. 23, 2013 (DE) ........................ 10 2013 216 867
Sep. 24, 2013 (DE) ........................ 10 2013 219 113

(51) Int. Cl.
*G01C 21/26* (2006.01)
*F41H 11/16* (2011.01)
(Continued)

(52) U.S. Cl.
CPC ........... *G08G 1/0125* (2013.01); *G07B 15/06* (2013.01); *G08G 1/0141* (2013.01); *G08G 1/087* (2013.01); *G08G 1/127* (2013.01); *G08G 1/20* (2013.01)

(58) Field of Classification Search
CPC .... G08G 1/0125; B60R 25/102; G07B 15/02; G07B 15/063; G01C 21/3691; G01C 21/26; F41H 11/16
See application file for complete search history.

(56) References Cited

U.S. PATENT DOCUMENTS 5,869,967 A * 2/1999 Straus ..................... F41H 11/16 324/260
6,336,075 B1 * 1/2002 Park .................. G01C 21/3691 340/988
(Continued)

FOREIGN PATENT DOCUMENTS

DE 10205453 A1 8/2003
DE 10304465 A1 5/2004
(Continued)

*Primary Examiner* — Yuri Kan
(74) *Attorney, Agent, or Firm* — Laurence Greenberg; Werner Stemer; Ralph Locher

(57) ABSTRACT

A system determines traffic information. The system contains a terminal having a position determination device for determining a position of the vehicle, a storage device for storing reference positions defined by location coordinates, and a processor which works together with the position determining device and the storage device. The processor compares a specific position of the vehicle with stored reference positions to determine whether the vehicle has passed a reference position. A reference position is defined by a safety line extending through the location coordinates thereof. The processor also determines whether the vehicle has traversed a safety line and evaluates the traversing of a determined safety line as the vehicle passes the reference position defined by the safety line. Therefore, the system can determine a position in a simple and reliable manner, including in an inner-city road network.

7 Claims, 1 Drawing Sheet

(51) Int. Cl.

| | |
|---|---|
| ***G08G 1/01*** | (2006.01) |
| ***G08G 1/087*** | (2006.01) |
| ***G07B 15/06*** | (2011.01) |
| ***G08G 1/127*** | (2006.01) |
| ***G08G 1/00*** | (2006.01) |

(56) References Cited

U.S. PATENT DOCUMENTS

| | | | | |
|---|---|---|---|---|
| 6,684,155 | B1 * | 1/2004 | Chen | B60R 25/102<br>340/995.2 |
| 8,489,313 | B2 * | 7/2013 | Vollmer | G07B 15/02<br>340/539.12 |
| 2002/0077741 | A1 * | 6/2002 | Hanebrink | G01C 21/26<br>701/117 |
| 2012/0215594 | A1 * | 8/2012 | Gravelle | G07B 15/063<br>705/13 |

FOREIGN PATENT DOCUMENTS

| | | | |
|---|---|---|---|
| DE | 102006002376 | A1 | 7/2007 |
| EP | 2017637 | A1 | 1/2009 |
| JP | 2005140694 | A | 6/2005 |
| JP | 2013088899 | A | 5/2013 |
| WO | 2012112877 | A1 | 8/2012 |

* cited by examiner

SYSTEM FOR DETERMINING TRAFFIC INFORMATION

BACKGROUND OF THE INVENTION

Field of the Invention

The invention relates to a system for determining traffic information according to the preamble of the main claim.

The basis of a plurality of traffic information is a position determination of vehicles within a road network. Of particular interest here are the time instants at which a specific vehicle passes predetermined positions in the road network. To this end, mobile or permanently installed terminals which have a position determination facility are carried along in vehicles of interest. A receiver module for satellite signals of a global satellite-supported navigation system is widely used here, for instance the American NAVSTAR GPS, the Russian GLONASS or the European GALILEO system. With the aid of the satellite signals, the terminal position and as a result the vehicle position of a vehicle carrying along the terminal can be determined cyclically, every second for instance. If an electronic map is available in the terminal, the specific vehicle position can be related to the map. The carrying-along and updating of electronic maps is complicated and the continuous relationship of a vehicle position to a map is also not required for many applications of interest. Instead, it is sufficient if the location coordinates of the positions in a road network which are actually of interest are stored as reference positions in a storage facility. A processing facility which works together with the position determination facility and the storage facility can then compare a currently determined vehicle position with stored reference positions. As a result, it can determine whether the vehicle has passed one of the reference positions. In order to intercept measuring and driving inaccuracies, an interception circuit is placed around the reference position as a tolerance range, wherein the reference position is regarded as being passed by a vehicle if it has traversed the interception circuit.

The application DE 10 2006 002 376 A1 discloses an apparatus for identifying through traffic with a terminal built into the vehicle. The terminal has a position determination system and a computing unit with a memory. The computing unit is embodied such that it identifies an entry and exit of a predetermined area on the basis of the position of the vehicle. To this end, the coordinates of the entry and exit points are preferably stored in the memory as geo coordinates. The currently determined position is compared in each case with the positions of the entry and exit points stored in the memory. If the measured position corresponds to an entry point or the position is disposed in an interception circuit about the entry point, a timer is started, which records the time taken until an exit point is reached.

The application DE 102 05 453 A1 discloses a position determination method for a traffic charge toll system. The position of the vehicle is determined by means of a detector unit provided in the vehicle and is compared with defined reference points on a stretch of road. The reference points have tolerance ranges with different dimensions so that the reference points can be better adjusted to the local conditions. With adjacent reference points in the region of intersections or such like, a deviation can be determined with a larger tolerance range and a decision can be made with a smaller tolerance range. The driving history including curve shapes is used supportively for a more precise differentiation. If the vehicle is on a stretch of road which is legally obligated to pay traffic charges, for instance on a motorway, transfers of traffic charges are performed in a calculation and booking unit as a function of the section of road traveled.

If one assumes an inaccuracy of the position determination by means of GPS of approx. 5 m to 10 m, a passable road width at the junction of approx. 5 m and a delay accruing as a result of the calculation every second of the terminal position via GPS for instance, the diameters of the interception circuits must amount to at least 15 m to 20 m or more. This accuracy is in most cases sufficient for applications in the regional road network, in the inner-city area with its dense road network, this may to some extent result in overlaps in the interception circuits, particularly at junctions. If the diameter of the interception circuit is restricted, there is however the risk of a vehicle driving around the interception circuit and the reference position being regarded as not being passed.

BRIEF SUMMARY OF THE INVENTION

The object therefore underlying the invention is to provide a generic system which allows for a simple and reliable position determination also in an inner-city road network.

The object is achieved in accordance with the invention by a system of the type cited in the introduction, having the features specified in the characterizing part of claim 1. Accordingly, a system for determining traffic information comprises a terminal which is carried along in a vehicle. The terminal has a position determination facility for determining a vehicle position of the vehicle in a road network, a storage facility for storing reference positions defined by location coordinates and having a processing facility which works together with the position determination facility and the storage facility. The processing facility is designed to compare a certain vehicle position with stored reference positions in order to determine whether the vehicle has passed one of the reference positions. In accordance with the invention, a reference position is defined by a safety line running through its location coordinates. Here the processing facility is embodied to determine whether the vehicle has traversed a safety line and to evaluate the traversing of a defined safety line as a vehicle passes the reference position defined by the safety line. Rejecting the long-standing conventional circular area-type tolerance ranges of reference positions for inventive linear tolerance ranges allows for a clear separation and identification also of dense adjacent reference points, as occur in an inner-city road network, in particular at junctions. The position determination of vehicles passing reference positions can also be detected here with greater reliablity in such road networks.

In an advantageous embodiment of the inventive system, the safety line is defined by a reference driving direction for vehicles assigned to the reference position of the carriageway and runs at right angles to this. The position determination facility is embodied to determine the driving direction of the vehicle. The processing facility is embodied to compare a driving direction of the vehicle specified with a traversing of a defined safety line with stored reference driving directions. The comparison of the driving direction measured by the position determination facility, which results from the direction of the polyline connecting past vehicle positions, with the stored reference driving direction as an additional criterion of decision for the definition of a traversing of a safety line is used in particular with very closely positioned reference positions. In particular, despite a determined traversing of safety lines by a vehicle, a passing of the reference position can be ruled out if the safety line was traversed by the vehicle in a driving direction which deviates significantly from the reference driving direction. The safety line preferably runs at right angles to the reference driving direction.

In a preferred embodiment of the inventive system, the safety line is defined by a safety line length assigned to the reference position of the carriageway. The length of the safety line can be individually adjusted to the width of the lane, of the carriageway or the road at any reference position. If the reference position is disposed centrally in the road layout, its location coordinates can be used as a support point of the safety line, to both sides of which safety line sections of equal length connect. It is then sufficient to store the safety line length as a defining feature of the reference position.

In an advantageous embodiment of the inventive system, the terminal comprises a signaling facility which works together with the processing facility and which is embodied, after determining that a vehicle has passed a reference position, to output a message having the location coordinates, a time instant of the vehicle passing and identification data of the terminal. Messages are only, but automatically, generated if a vehicle has passed a reference position. A continuous transmission of vehicle positions is avoided here, but can in special cases also be performed. The messages can be transferred for further processing to an application program running on the terminal. Alternatively, the messages can be transferred for instance wirelessly to another vehicle device or directly to an additional application in the terminal for further processing.

The inventive system preferably comprises a traffic control center assigned to the road network to further process messages, wherein the terminal has a communication facility for the wireless transmission of messages output to the traffic control center.

In a preferred embodiment of the inventive system, reference positions stored in the storage facility are assigned message attributes comprising type and/or address and/or content and/or cycle of a message to be output.

In an inventive system, reference positions can preferably be added or deleted or the defining features thereof and message attributes can be changed by the traffic control center by means of the communication facility in the storage facility of the terminal. Reference positions can thus be changed dynamically, for instance validated temporarily.

In further advantageous embodiments of the inventive system, the traffic control center is embodied as a toll charge center for collecting road use charges in the road network, wherein chargeable stretches of road are assigned reference positions.

The traffic control center can also be embodied as a traffic management control center for determining travel times in the road network, wherein end points of stretches of road are assigned reference positions.

The traffic control center can also be embodied as a control center for recovery vehicles, such as for instance emergency vehicles or local public transport vehicles, in order to prioritize these at traffic-signal-controlled nodal points of the road network, wherein accesses to nodal points are assigned reference positions. When reference points are passed, enabling signal requests from emergency vehicles are triggered directly from the traffic control computer of the traffic control center.

The traffic control center can also be embodied as a control center for local public transport vehicles in order to activate passenger information facilities, wherein connecting roads between stations of the vehicles are assigned reference positions. The traffic computer only transmits the anticipated remaining travel times of the local public transport vehicles from reference points to the next station.

Similarly, messages can be sent cyclically to the terminals from a traffic control center, said messages only being shown in the vehicle by the terminal when a reference position is crossed from above. For instance, in this way virtual road signs can indicate predefined reference positions. In this respect, the system is also embodied to display or output traffic information, in particular for the position-dependent output of traffic information.

DESCRIPTION OF THE INVENTION

Figure 2:
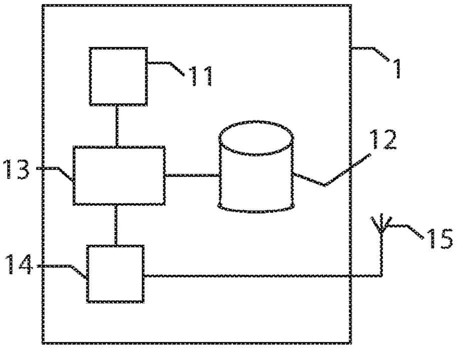
FIG. 2 is a block diagram of a terminal for a system for determining traffic information.
Figure 1:
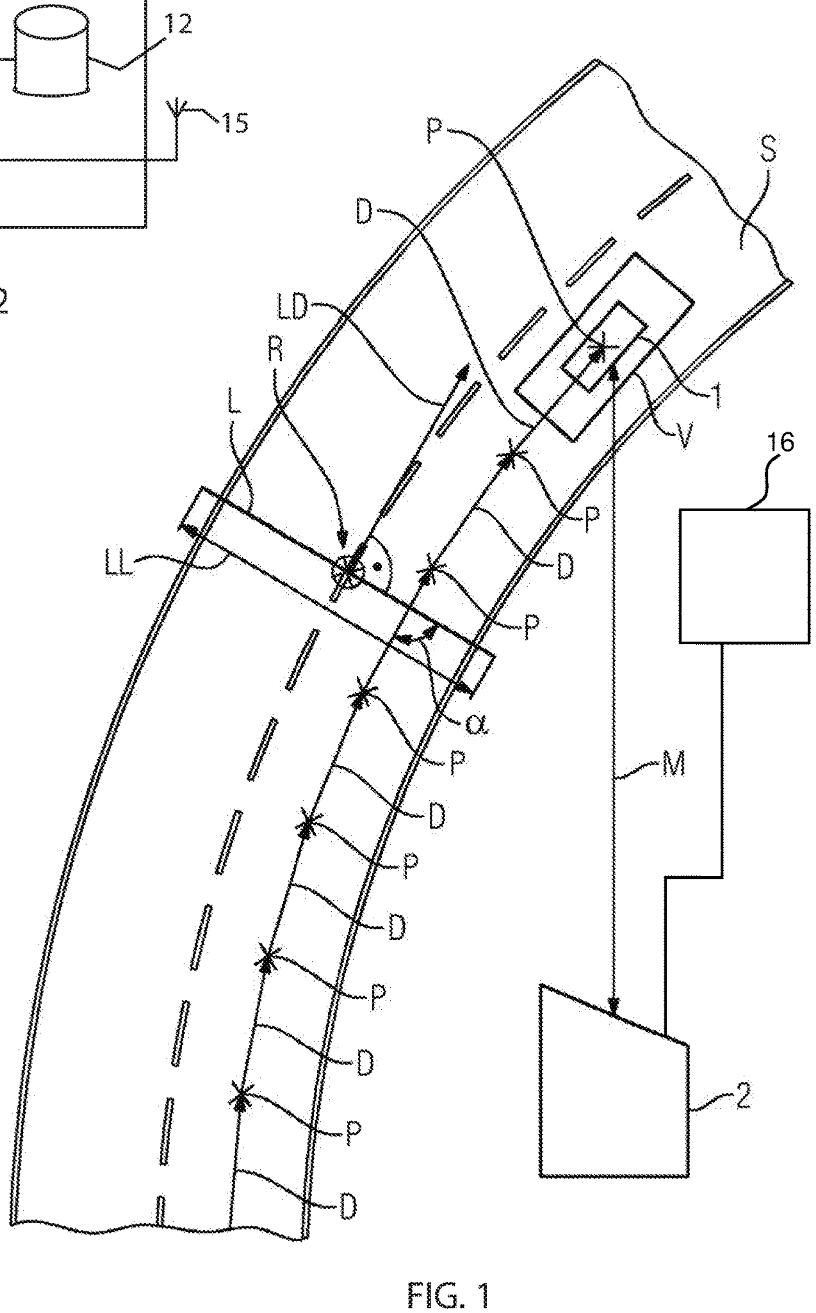
FIG. 1 is an illustration showing a section of road with a defined reference point according to the invention.

According to FIGS. 1 and 2, a system for determining traffic information comprises a terminal 1 carried along in a vehicle V and a traffic control center 2 assigned to the road network used by the vehicle V. The terminal 1 has a facility 11 for determining a vehicle position P of the vehicle V in the road network, for instance on the carriageway S shown. A driving direction D of the vehicle V is produced from the connecting vector of two vehicle positions P determined one after the other.

The terminal 1 has a storage facility 12, in which reference positions R of points in the road network which are relevant to traffic information are stored. The reference position R is defined by a straight safety line L, which runs through the location coordinates of the reference position R and at right angles to the carriageway S. It has a safety line length LL, which protrudes beyond the carriageway S on both sides. Moreover, the safety line L is defined by a reference driving direction LD assigned to the reference position R, the reference driving direction representing a direction of movement predetermined by the traffic routing to the reference position R and being disposed at right angles to the safety line L for instance.

A processing facility 13 determines whether the vehicle V traverses the safety line L and at what traversing angle $\alpha$ the safety line L was traversed. To this end the specific vehicle positions P are compared with the position and length of the safety line L. In addition, when the safety line is traversed, the driving direction D is compared with the reference driving direction LD. If by complying with predeterminable comparison accuracies it is determined that the safety line L was traversed in the reference driving direction LD, the processing unit determines that the vehicle V has passed the reference position R.

In this case, a signaling facility 14 of the terminal 1 outputs a message M relating to the location coordinates and time instant that the vehicle passed. If necessary, the message M still contains identification data of the terminal 1, so that a series of messages M can be assigned to the outputting terminal 1. The output message M is transmitted wirelessly to the traffic control center 2 for further processing by means of a communication facility 15 of the terminal 1. In the storage facility 12, specific message attributes can be assigned to the reference positions R, such as for instance the type and/or the addresses and/or the content and/or the cycle of a message M to be output. Conversely, reference positions R can be added or deleted in the storage facility 12 of the terminal 1 by the traffic control center 2 by means of the communication facility 15, or the defining features and message attributes thereof can be changed.

The advantage of the inventive system consists in it being possible to perform a position determination by a mobile terminal 1 at predefined reference points R without using a digital road map by means of a definition of a reference object which is very simple to generate. The feature as a safety line L combined with the associated reference driving direction LD and safety line length LL allows for a more accurate and reliable detection of a defined reference position P being reached or passed, compared with previous methods. Here the actual location coordinate of the reference position R does not have to be reached exactly. Differently to interception circuits with an extended circular area, the reference driving direction LD on a safety line L is clear. The safety line length LL can be adjusted to the local conditions. The problem of overlapping adjacent reference objects is considerably reduced in safety lines by comparison with interception circuits. The position determination method also optimizes the temporal behavior in the terminal 1 when a reference position R is identified. A universally usable method is described by the use of additional message attributes for reference positions R, said method being suited both to use in a traffic control center 2 and also in the same or a further mobile terminal.

Reference numeral 16 shows a passenger information facilities connected to and activated by the traffic control center 2

The invention claimed is:

1. A system for determining traffic information, the system comprising:

a terminal carried along in a vehicle, said terminal having:

a position determination facility for determining a vehicle position and a driving direction of the vehicle in a road network;

a memory for storing reference positions defined by location coordinates; and a processing facility which works together with said position determination facility and said memory, said processing facility comparing a specific position of the vehicle with stored reference positions for determining whether the vehicle has passed one of the reference positions, a reference position is defined by a safety line running through the location coordinates thereof, wherein the safety line is defined by a reference driving direction for vehicles assigned to the reference position of a carriageway and runs at right angles to this, wherein said processing facility being embodied to determine whether the vehicle has traversed the safety line, to compare a driving direction of the vehicle determined with a traversing of a determined safety line with stored reference driving directions and to evaluate the traversing of the determined safety line as the vehicle passes the reference position defined by the safety line, wherein a passing of the reference position is excluded if the safety line was traversed by the vehicle in a driving direction which deviates from the reference driving direction.

2. The system according to claim 1, wherein the safety line is defined by a safety line length assigned to the reference position of the carriageway.

3. The system according to claim 1, wherein said terminal has a signaling facility which works together with said processing facility, said signaling facility is embodied, after defining that the vehicle has passed the reference position, to output a message having the location coordinates, a passing time instant and identification data of said terminal.

4. The system according to claim 3, further comprising a traffic control center assigned to the road network for further processing messages, wherein said terminal has a communication facility for a wireless transmission of messages output to said traffic control center.

5. The system according to claim 4, wherein the reference positions stored in said memory are assigned message attributes containing at least one of a type, an address, a content or a cycle of a message to be output.

6. The system according to claim 5, wherein the reference positions can be added or deleted by said traffic control center by means of said communication facility in said memory of said terminal or defining features and message attributes thereof can be changed.

7. The system according to claim 4, wherein said traffic control center is:

a toll control center for collecting road use charges in the road network, wherein chargeable stretches of road are assigned the reference positions; or a traffic management control center for determining travel times in the road network, wherein end points of stretches of road are assigned the reference positions; or a control center for emergency vehicles for their prioritization to traffic signal-control nodal points of the road network, wherein accesses to the nodal points are assigned the reference positions; or a control center for local public transport vehicles for activating passenger information facilities, wherein connecting roads between stations of the vehicle are assigned the reference positions.

* * * * *